Nov. 20, 1962

R. J. BROWN 3,065,425

PULSE DELAYER USING SHOCK-EXCITED L-C RESONANT CIRCUIT HAVING SINUSOIDAL OUTPUT EFFECTING THRESHOLD TRIGGERING OF NEON BULB

Filed Aug. 13, 1957

INVENTOR:
RALPH J. BROWN,

BY Donald N. Timbie
HIS ATTORNEY.

United States Patent Office 3,065,425

Patented Nov. 20, 1962

3,065,425

PULSE DELAYER USING SHOCK-EXCITED L-C RESONANT CIRCUIT HAVING SINUSOIDAL OUTPUT EFFECTING THRESHOLD TRIGGERING OF NEON BULB

Ralph J. Brown, Utica, N.Y., assignor to General Electric Company, a corporation of New York Filed Aug. 13, 1957, Ser. No. 678,005

2 Claims. (Cl. 328—55)

This present invention relates to a pulse delay circuit having general applicability but that is especially suitable for gating the chroma sub-carrier synchronizing burst of the video signal into the chroma sub-carrier synchronizing circuit of a color television receiver.

There has been a need in color television receivers for an inexpensive but effective method of creating a properly phased pulse of proper shape and amplitude for the purpose of gating the chroma sub-carrier synchronizing circuit. It is essential that the chroma synchronizing circuit be gated on only during the interval when chroma synchroniing information is available in the signal. Following this interval the burst gate should be biased entirely out of conduction for the remainder of the horizontal cycle.

Prior art disclosures have introduced complex and expensive circuitry in order to perform the aforesaid function satisfactorially.

Accordingly, it is an object of this invention to provide an inexpensive pulse delay circuit for creating a proper phased pulse of proper shape and amplitude for gating a chroma sub-carrier synchronizing circuit.

A further object of this invention is to provide a simple, inexpensive, general purpose pulse delay circuit.

In carrying out this invention in one illustrative embodiment thereof, a resonant circuit is connected to a gaseous discharge device having a predetermined voltage ignition level. An impedance is serially connected to the gaseous discharge device. Input waves are applied to the resonant circuit which is tuned to a frequency component of the input. A sine wave is produced corresponding to this frequency component. The gaseous discharge device passes this component wave to the impedance after the voltage of input wave reaches the ignition voltage of the gaseous discharge device. Consequently, a time delay is introduced between the initiation of the input wave and the appearance of a voltage across the impedance.

In another specific embodiment, the aforesaid circuit is utilized for gating the chroma sub-carrier synchronizing circuit. Additional components are provided for shaping the delayed output.

The features of my invention that I believe to be novel are set forth with particularity in the appended claims. My invention, itself, however, both as to its structure and mode of operation, together with further objects and advantages thereof, may best be understood by reference to the following description taken in connection with the accompanying drawings in which:

Figure 1:
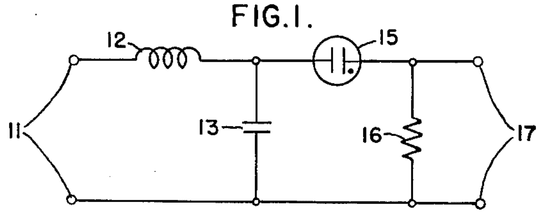
FIG. 1 is a schematic diagram of one embodiment of the present invention.

In the basic circuit shown in FIG. 1, a pair of input terminals 11 are provided for application of an input pulse that is to be delayed. A resonant circuit comprising inductor 12 and capacitor 13, which is tuned to one of the frequency components of an input pulse, is connected across terminals 11. The resonant circuit may not be required if the input wave has a gradual leading edge such as, for example, the leading edge of a sawtooth wave. A gaseous discharge device 15 and a resistor 16 are connected in series across capacitor 13. The gaseous discharge device 15 is preferably a neon bulb because it is inexpensive, reliable and produces excellent results. A pair of output terminals 17 are connected across resistor 16.

Figure 2:
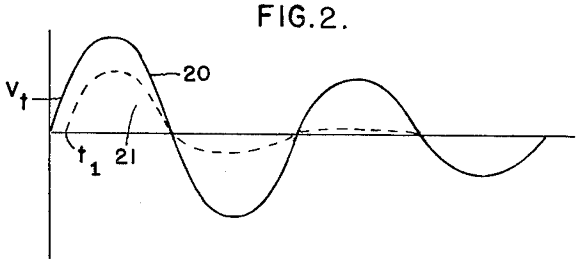
FIG. 2 is a graph of two damped sine waves that appear at various points in the circuit of FIG. 1.

Referring now to the sine waves of FIG. 2 to aid in the explanation in the operation of the circuit of FIG. 1, wave 20 is the damped sine wave that appears across capacitor 13 each time a pulse is applied at input terminals 11. Sine wave 20 is damped by the inherent resistance of the resonant circuit. When wave 20 rises to the ignition voltage, $V_t$, of gaseous discharge device 15, at time $t_1$, gaseous discharge device 15 completes a circuit to resistor 16 producing wave 21 across resistor 16. The time $t_1$ between the initiation of waves 20 and 21 is the delay produced by this circuit. Of course, once gaseous discharge device 15 has started conducting it remains in conduction until wave 20 decreases to its cut-off voltage, and thereafter until its gas de-ionizes. Consequently, after gaseous discharge device 15 starts conducting wave 21 remains in phase with wave 20. It should be noted that wave 21 is damped considerably after the first half-cycle of wave 20. This is due to the firing of gaseous discharge device 15 which effectively loads the resonant circuit with resistance 16. This result is advantageous in that the firing voltage of device 15 is attained only on the first half-cycle of a desired input wave which minimizes faulty firing.

The delay in the circuit of FIG. 1 can be changed by suitable selection of gaseous discharge devices having different ignition voltages. A change in delay can also be produced through the tuning of the resonant circuit of inductor 12 and capacitor 13. The frequency of wave 20 depends upon the frequency to which the resonant circuit is tuned. Thus, if it is tuned to a higher frequency than that shown, the resulting wave across capacitor 13 arrives at the ignition voltage $V_t$ sooner than time $t_1$ resulting in a decrease in delay. On the other hand, if the resonant frequency is tuned to a frequency that is lower than that shown, the wave across capacitor 13 takes longer than $t_1$ to rise to voltage $V_t$, and there is a increase in delay.

Figure 3:
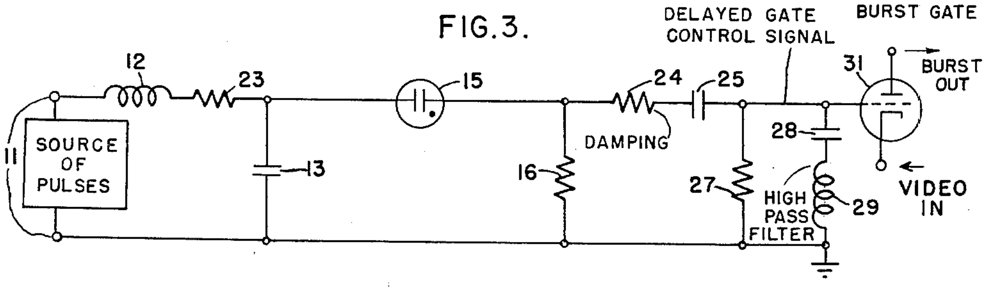
FIG. 3 is a schematic diagram of an embodiment of the present invention that is suitable for providing a gate pulse for the chroma sub-carrier synchronizing circuit.

A modified version of the delay circuit of FIG. 1 can be used to produce the gating pulse for gating the chroma sub-carrier synchronizing signal (burst). Such a modified circuit is shown in FIG. 3 wherein components corresponding to components of FIG. 1 are identified by the same reference numerals. In FIG. 3, a damping resistor 23 has been inserted in the resonant circuit to severely damp oscillations beyond the first half-cycle of wave 20. A clipping resistor 24, a coupling capacitor 25 and a grid-leak resistor 27 are respectively connected in series across resistance 16. A series resonant circuit comprising capacitor 28 and inductor 29 is connected across resistor 27. Resistor 27 is connected to the grid of a gating tube 31 to provide the proper grid bias for tube 31. The resonant circuit of capacitor 28 and inductor 29 which is also connected to the grid of gating tube 31 presents a short to ground for burst frequencies at the grid of tube 31. The video signal is applied at the cathode of tube 31, and since the grid of this tube is shorted for burst in the video signal, this tube acts as a grounded-grid amplifier as well as a gate for the bursts.

Before the operation of the FIG. 3 circuit is discussed, mention should be made of the purpose of gating the burst and of the signals that are used for gating. As is well known in the art, it is essential that the chroma signal circuit be gated only during the interval when the burst or chroma synchronizing information is available from the video signal. Following this interval the burst gate should be biased entirely out of conduction for the remainder of the horizontal cycle. Unwanted information is thereby prevented from affecting the sub-carrier phasing. Obviously, the ideal gating pulse should be rectangular in shape with zero rise and fall time. The purpose of the circuit of FIG. 3 is to produce a pulse that approaches this ideal.

FIG. 3 must be a delay circuit because there are no pulses that occur at the proper time for gating the bursts. However, since the bursts occur right after the horizontal synchronizing signal, pulses are available in the horizontal synchronizing circuit which if delayed can be used for gating the bursts. Several such signals could be used: for example, the horizontal synchronizing pulse or the horizontal fly-back pulse. The operation of the circuit of FIG. 3 is explained with reference to a horizontal fly-back pulse input.

Figure 4:
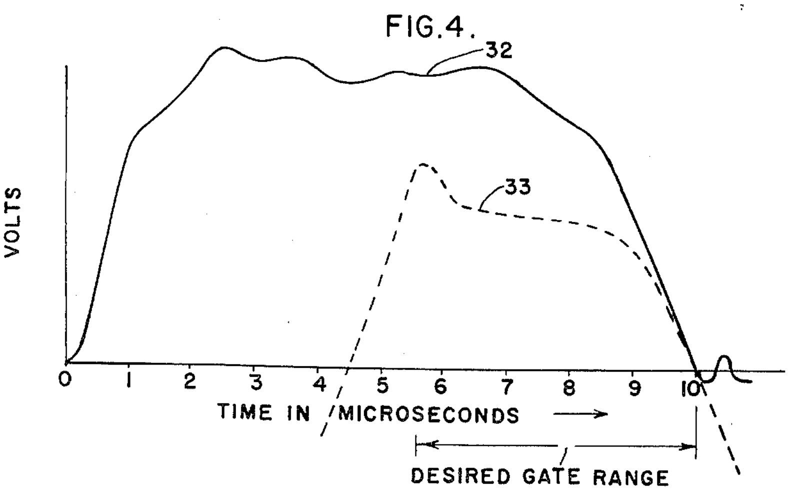
FIG. 4 shows input and output waves for the circuit of FIG. 3.

The wave forms of FIG. 2 and FIG. 4 will be referred to during the explanation of the FIG. 3 embodiment. The horizontal fly-back pulse 32 of FIG. 4 is applied to the input terminals 11 of the FIG. 3 embodiment. A wave similar to wave 20 of FIG. 2 is thereby developed in the resonant circuit of inductor 12 and capacitor 13. When the magnitude of wave 20 reaches the ignition level of gaseous discharge device 20, device 20 begins conducting thereby producing a wave similar to wave 21 across resistance 16. Due to the presence of damping resistor 23 and the inherent damping provided by the circuit as previously explained, any oscillations occurring beyond the first cycle are so damped that gaseous discharge device 15 is not triggered on until the next horizontal fly-back pulse occurs. This damping action prevents improper gating.

Voltage 33 of FIG. 4, which is the voltage appearing across resistor 27, is up to the time that the grid of tube 31 goes positive, approximately equal to the voltage 21. It is not exactly the same due to a small voltage drop across resistor 24. Since resistor 27 is designed to have a much larger resistance than resistor 24, most of wave 21 appears across resistor 27. When the grid of tube 31 goes positive due to the positive voltage appearing across resistor 27, a very low resistance path exists between the grid and cathode. This low resistance path is in parallel with resistor 27. Because resistor 24 is much greater in value than this grid to cathode resistance, further increases in voltage 21, beyond the voltage necessary to cause grid conduction, appear mostly across resistor 24. This voltage absorbing or clipping action by resistor 24 flattens the top of the voltage as it appears across resistor 27. Thus, wave 33, which is this clipped voltage, has a fairly flat top. Tube 31, in normal use, is biased on its cathode so that only the top ⅓ to ½ of wave 33 is effective. That is only the top portion of wave 33 gates tube 31.

From the above it is seen that wave 33 is approximately of rectangular shape. By providing a rectangular wave which gates tube 31 only on its upper portion, improper gating action is thereby prevented. In regards to time delay for wave 33, this delay is shown in FIG. 4 to be approximately 4.4 microseconds which corresponds to the delay $t_1$ of FIG. 2. This corresponds to the delay necessary in using the horizontal fly-back pulse for gating purposes.

By way of example only, the circuit values which have been found to provide satisfactory operation with the circuit of FIG. 3 are as follows:

Inductor 12=1800 microhenries.
Resistor 23=390 ohms.
Capacitor 13=1800 micromicrofarads.
Gaseous discharge device 15 is a NE–2X, 60 volt neon lamp.
Resistor 16=39,000 ohms.
Resistor 24=10,000 ohms.
Capacitor 25=4700 micromicrofarads.
Resistor 27=1 megohm.
Capacitor 28=20 micromicrofarads.
Inductor 29=100 microhenries.
Tube 31 represents the triode portion of a 6AU8.

In summary, a circuit has been disclosed that produces a desired pulse delay in an input pulse. If the input pulse does not have a leading edge with a good slope, means are provided to convert this pulse into a wave having approximately a sine wave shape. The input pulse energizes a gaseous discharge device which conducts when the energizing wave has risen to a certain value. Conduction of this device completes a circuit through an impedance across which the delayed pulse is produced by the conduction current. The time delay produced can be changed by varying the frequency of the sine wave to which the input pulse is converted or by utilizing gaseous discharge devices that have different operating voltage levels. Of course, both adjustments can be made if desired. This circuit can be used to produce a burst gating pulse. If it is so used, it is advisable to include means for damping the sine wave, so that the sine wave lasts for only one cycle. Also, it is advisable to include means for clipping the top of the delayed pulse.

Although the invention has been described by reference to particular embodiments thereof, it is understood that numerous modifications may be made by those skilled in the art without departing from the invention itself. Therefore, I aim in the appended claims to cover all such variations as come within the true spirit and scope of my invention.

What I claim as new and desire to secure by Letters Patent of the United States is:

1. In a color television system, a circuit operating from a series of pulses to produce pulses of proper phase, shape and amplitude for gating the chroma subcarrier synchronizing circuit, said circuit comprising:

(*a*) a pair of input terminals,
(*b*) an inductor, a resistor and a capacitor serially connected across said input terminals,
(*c*) a neon bulb and a second resistor serially connected across said capacitor,
(*d*) a third resistor, a second capacitor and a fourth resistor serially connected across said second resistor,
(*e*) a third capacitor and a second inductor serially connected across said third resistor,
(*f*) a gating device having plate, cathode, and grid electrodes,
(*g*) and means connecting said third capacitor to said grid electrode.

2. A burst gate circuit which is adapted to operate from a series of pulses to produce another series of pulses of proper phase, shape, and amplitude for gating the chroma subcarrier synchronizing circuit of a color television receiver, said circuit comprising:

(*a*) a pair of input terminals, (b) means for applying a series of pulses to said input terminals, (c) a resonant circuit connected to said input terminals for producing a sine wave voltage from said pulses, (d) a neon bulb having a predetermined voltage conduction characteristic, (e) means for applying said sine wave voltage to said neon bulb for producing a delayed pulse voltage therefrom, (f) a gating device having a predetermined operating characteristic, (g) means for applying said delayed pulse voltage to said gating device including circuit means and the operating characteristic of said gating device for shaping said delayed pulse voltage to approximate a rectangular configuration.

References Cited in the file of this patent

UNITED STATES PATENTS

| | | |
|---|---|---|
| 2,153,202 | Nichols | Apr. 4, 1939 |
| 2,227,906 | Kellogg | Jan. 7, 1941 |
| 2,418,375 | Tourshou | Apr. 1, 1947 |
| 2,420,309 | Goodall | May 13, 1947 |
| 2,495,780 | Shepherd | Jan. 31, 1950 |
| 2,529,172 | Moe | Nov. 7, 1950 |
| 2,570,442 | Grosdoff | Oct. 9, 1951 |
| 2,636,133 | Hussey | Apr. 21, 1953 |
| 2,654,028 | Levy | Sept. 29, 1953 |
| 2,689,299 | Anderson | Sept. 14, 1954 |
| 2,697,825 | Lord | Dec. 21, 1954 |
| 2,747,146 | McDonald | May 22, 1956 |
| 2,878,382 | Creveling | Mar. 17, 1959 |
| 2,891,155 | Carr | June 16, 1959 |